United States Patent [19]
Herlitzius

[11] Patent Number: 4,776,252
[45] Date of Patent: Oct. 11, 1988

[54] MACHINE FOR SLICING ESSENTIALLY CIRCULAR BAKED GOODS

[75] Inventor: Reiner Herlitzius, Soest, Fed. Rep. of Germany

[73] Assignee: Gebruder Herlitzius GmbH & KG Maschinenfabrik, Soest, Fed. Rep. of Germany

[21] Appl. No.: 911,961

[22] Filed: Sep. 25, 1986

[51] Int. Cl.⁴ .............................................. B26D 3/30
[52] U.S. Cl. ...................... 83/874; 83/167; 83/356.3; 83/459; 83/466; 83/870
[58] Field of Search ............... 83/872, 870, 873, 874, 83/676, 164, 165, 167, 466, 446, 447, 335, 422, 459, 356.3, 700

[56] References Cited

U.S. PATENT DOCUMENTS

| | | | |
|---|---|---|---|
| 1,417,843 | 5/1922 | Knapp | 83/446 |
| 1,879,796 | 9/1932 | Ehrlich | 83/872 |
| 1,939,279 | 12/1933 | Rogalewski | 83/874 |
| 2,361,615 | 10/1944 | Elrod | 83/872 |
| 2,509,799 | 5/1950 | Billfaldt | 83/872 |
| 2,710,637 | 6/1955 | Fish | 83/872 |
| 3,101,104 | 8/1963 | Sullivan | 83/447 |
| 3,623,525 | 11/1971 | Kieves | 83/676 |
| 4,176,570 | 12/1979 | Hutchins | 83/447 |
| 4,283,979 | 8/1981 | Rakocy et al. | 83/676 |

FOREIGN PATENT DOCUMENTS

530310  7/1931  Fed. Rep. of Germany ........ 83/676

*Primary Examiner*—E. R. Kazenske
*Assistant Examiner*—Hien Huy Phan
*Attorney, Agent, or Firm*—Herbert Dubno

[57] ABSTRACT

A machine to slice baked goods such as bagels is provided which achieves a uniform and reproducible slice thickness. The machine comprises a housing, a vertical shaft, at least one spiral cutter, and at least one hold-down mechanism. The hold-down mechanism consists of a double-armed lever wherein one arm forms a pressure plate and another arm is attached to a tension spring with the ends of the pressure plate and other arm connected by means of a pivot shaft. Within the cutting area there is located a stop for positioning the baked goods to be sliced. Other features of the machine include a disc attached to the vertical shaft and to which the spiral cutters are secured. An intermediate plate may be positioned between the disc and cutter to adjust the height of the cutter edge. A passage for removing cut slices is located in the cutting area leading to a chute emptying the slices into a hopper.

15 Claims, 4 Drawing Sheets

MACHINE FOR SLICING ESSENTIALLY CIRCULAR BAKED GOODS

BACKGROUND OF THE INVENTION

The present invention relates to a machine for slicing baked goods, preferably bagels, that are essentially circular. Large quantities of bagels are sold on the North American continent. Bagles are a type of baked goods essentially of an annular configuration in the form of a bun or roll with a central hole. These are produced by first boiling raw dough so that it grows solid on the outside. The bagel is then baked whereupon, because of its central hole, the interior achieves a uniform firmness.

SUMMARY OF THE INVENTION

In order to be able to cut such baked goods into slices of any thickness and do so consistently, the present invention proposes a cutting machine, in the housing of which there is a vertical shaft; this machine is provided with at least one spiral cutters, there being at least one hold-down in the housing, in the cutting zone incorporated therein; each of these cutters has a pressure plate that is acted upon by a spring. The baked goods that are fed into the housing by means of at least one conveyor are picked up by the rotating cutter and slid beneath the pressure plate of the hold-down, whereupon the cutting process takes place to produce slices of a desired thickness, and these slices then drop out of the housing. Once the individual baked goods have been cut, the rotating cutting or cutters slide a fresh piece of baked goods beneath the pressure plate of the hold-down or hold-downs so that this is raised and then clamps the baked goods into the cutting position. Using a cutting system according to the present invention, it is possible to achieve an extremely high throughput and to do so fully automatically.

The spiral cutter is secured to a disc that is attached to the shaft. Between the cutter(s) and the disc there can be an intermediate plate by means of which the thickness of the slices that are to be removed can be adjusted by changing said plate. Thus, the thickness of the slices that are to be cut off is determined by the thickness of the intermediate plate plus the thickness of the cutter. The thickness of the slices can also be adjusted by a central adjustment system that preferably provides for infinite adjustment by means of screws or the like.

The cutting area or areas is/are in each instance defined by a stop for the baked goods that are to be sliced. When these goods are picked up by the rotating cutter or cutters, they are brought by the stop into very specific cutting areas in which the hold-down or hold-downs are located so that the position for the baked goods is very specifically defined. It is expedient that the shape of the stop be matched to the shape of the baked goods that are to be cut, and is, for example, in the form of a trough, so as to create a very secure stop as a counter-stop during the cutting process.

In the cutting area or areas within the housing there is, in each instance, a cutting edge, this being associated with a cutting edge of the cutter. The lower face side of the cutting edge is at the same height as the upper side of the cutter, to which the cutter tapers down. The height of the cutter edge is adjustable, which makes it possible to match it to the thickness of the slice that may be desired on each occasion.

The hold-down is in each instance attached to the side wall of the housing, this being done in the cutting area areas, in which connection the height of the hold-down or is adjustable relative to the cutter, thus all the parts that are required to make an effective cut can be adjusted to the slice thickness that is desired in each instance.

The pivoting range of the pressure plate of the hold-down is defined in each instance in the direction towards the cutter by means of a cam or the like. Thereby is prevented the pressure plate dropping onto the rotating cutter under the action of the spring when the baked goods are being cut.

The hold-down consist of a double-armed lever, of which one arm forms the pressure plate, with a tension spring acting on the other arm. The tension on this spring is adjustable, so that the amount of pressure that is exerted on the baked goods that are to be cut can be varied. If these baked goods are relatively soft, not too great a pressure will be applied; this prevents the baked goods from becoming compressed, whereas, in the case of firmer baked goods, the pressure can be so adjusted as to be greater.

The pressure plate of the hold-down is characterized by having a major portion or surface thereof being oriented substantially parallel to the cutter. This orientation applies pressure to the baked goods in a direction perpendicular to the cutter.

The disc is provided with passages in the cutting area of the cutter, these passages being provided for the slices that are removed, so that these drop from the housing. To this end, beneath the housing there is a hopper, through which the slices that have been cut off are moved to a removal system so that they can be moved on to a packing machine.

Within the housing there is one or a plurality of chutes through which the baked goods that have been moved into the system by means of one or two conveyors are passed into the cutting machinery at a specific, timed rate. The one or more chutes end in the direction of movement of the cutter or cutters as viewed from the cutting area. They, the baked goods that are to be cut are picked up by the rotation of the cutter and slid beneath the pressure plate of the hold-down, in which connection this sliding motion ends at the stops that are used to limit said motion.

The shaft passes out of the housing and is connected preferably through an angle drive to a controllable drive motor, this resulting in a very compact and easily monitored machine.

The speed of movement of the conveyors of the feed system and the removal system is adjusted as a function of the cutting output of the machine, so that an optimal cyclic rate is achieved. The control functions can be made dependent on each other, so that should the cutting performance of the machine be varied, the speed of movement of the feed and removal conveyors will automatically be varied as well.

BRIEF DESCRIPTION OF THE DRAWING

An embodiment of the present invention is described in greater detail below on the basis of the drawings appended hereto. These drawings are as follows.

DETAILED DESCRIPTION

Figure 1:
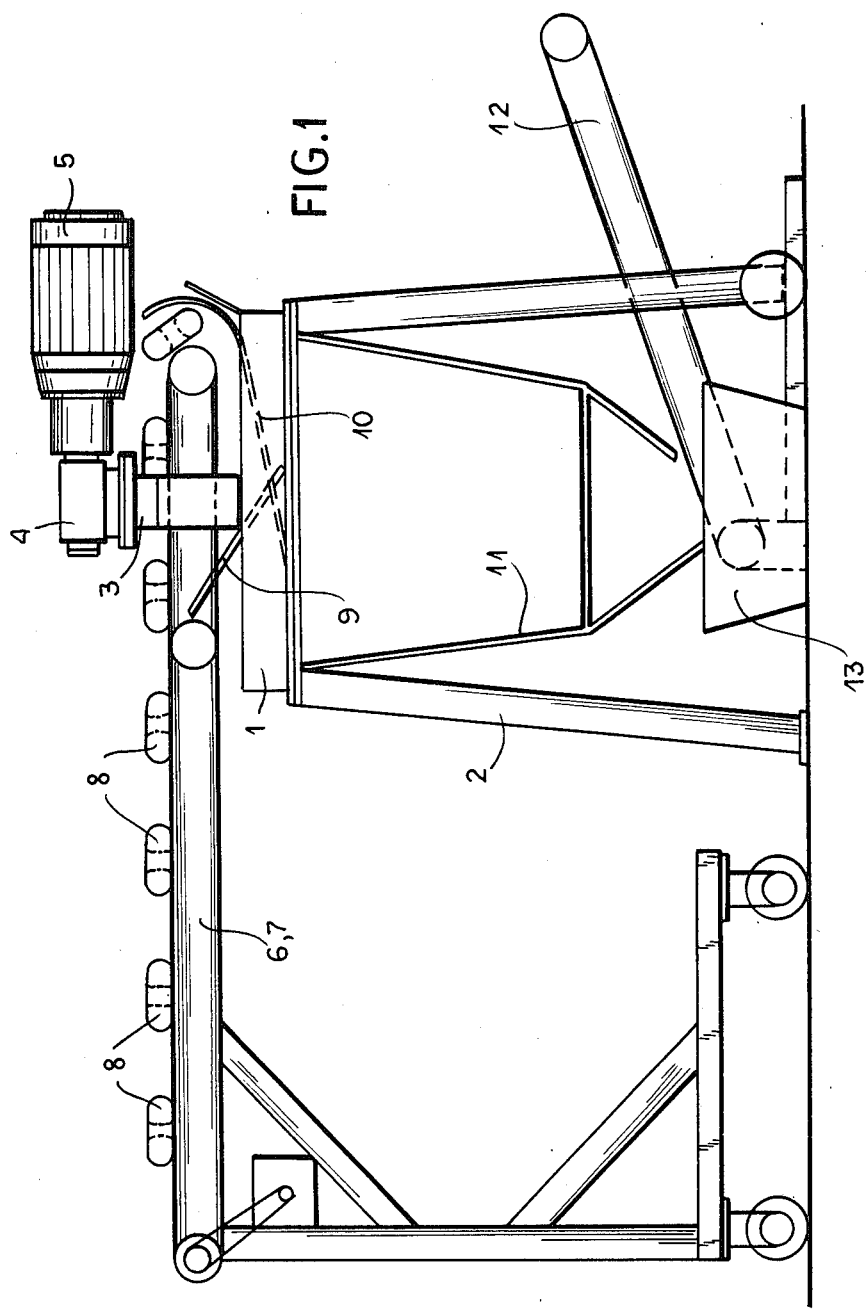
FIG. 1: a view of the cutting machine with the associated conveyors.

The housing of the cutting machine is numbered 1, and this is arranged on the frame 2. Within the housing 1 there is a vertical shaft 3 which leads to the outside of the housing. The shaft 3 is connected through the angle drive 4 with the drive motor 5, the speed of said motor being controllable.

The cutting machine incorporates two parallel conveyors 6, 7, these being configured as conveyor belts. The baked goods 8, preferably bagels, are moved to the machine with these conveyors 6, 7 and at the end of the conveyors 6 and 7 these pass down the chutes 9, 10 into the housing 1 of the cutter.

Beneath the housing 1 there is a hopper 11 through which the slices that have been removed from the baked goods 8 that are to be cut pass to the removal system 12. The waste that is formed is collected in the container 13, and this is emptied at intervals.

Within the housing 1 there are two spiral cutters 14, these being arranged on a disc 28 with intermediate plate 15 between them, this disc 28 being arranged at the lower end of the vertical shaft. The plate 15 can be replaced, so that the thickness "S" of the slice can be adjusted depending on the thickness of the plate 15. As can be seen from FIG. 4, this results from the thickness of the plate 15 and additionally the thickness of the cutter 14.

Figure 2:
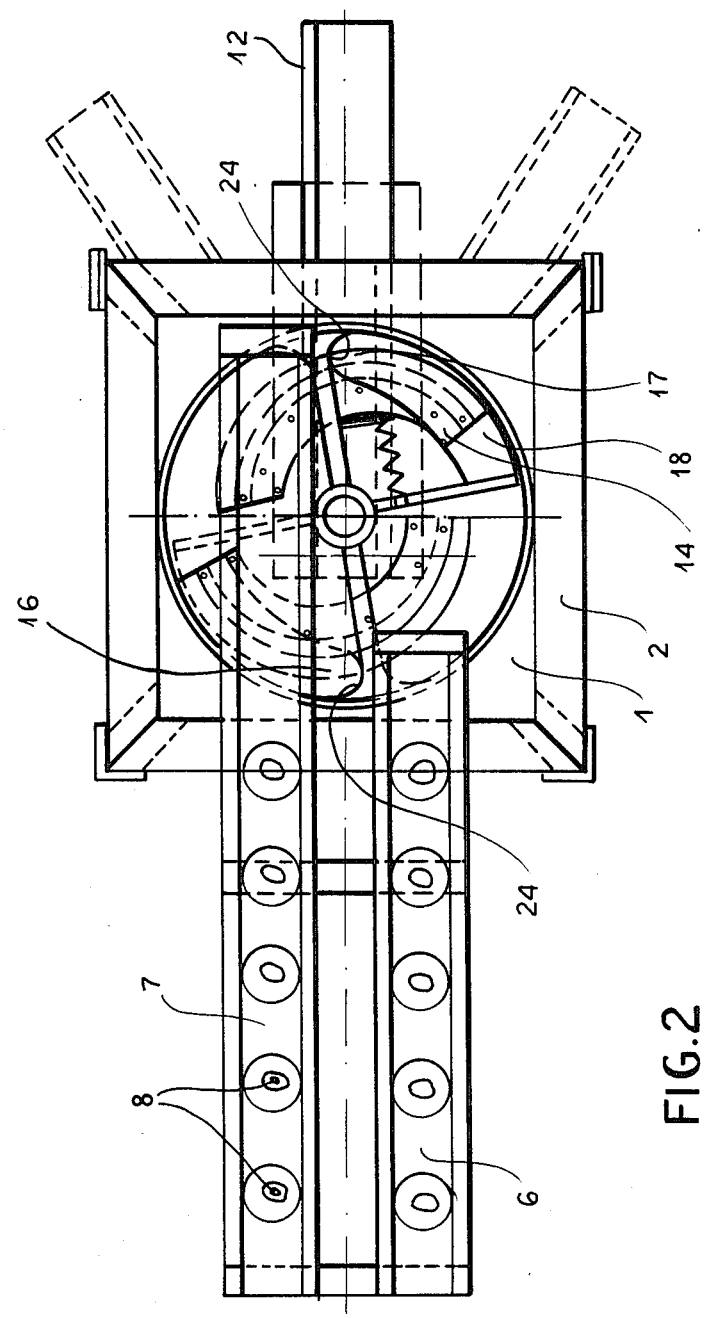
FIG. 2: a plan view of FIG. 1.
Figure 3:
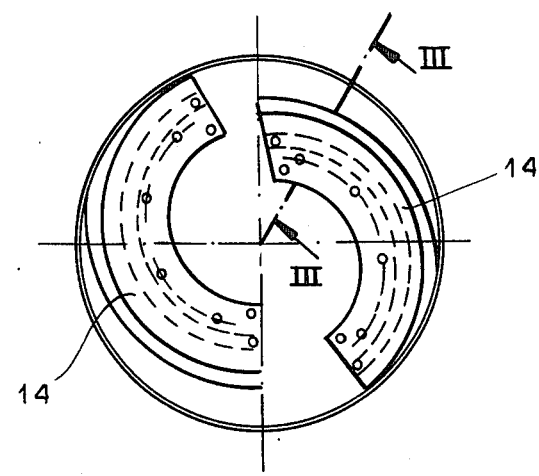
FIG. 3: a plan view of two spiral cutters.

Within the housing 1 there are hold-downs 18 within the cutting areas 16, 17; of these, only one is shown in FIG. 2. Each of these hold-downs has a pressure plate 19 that is acted upon by a spring 20.

Figure 6:
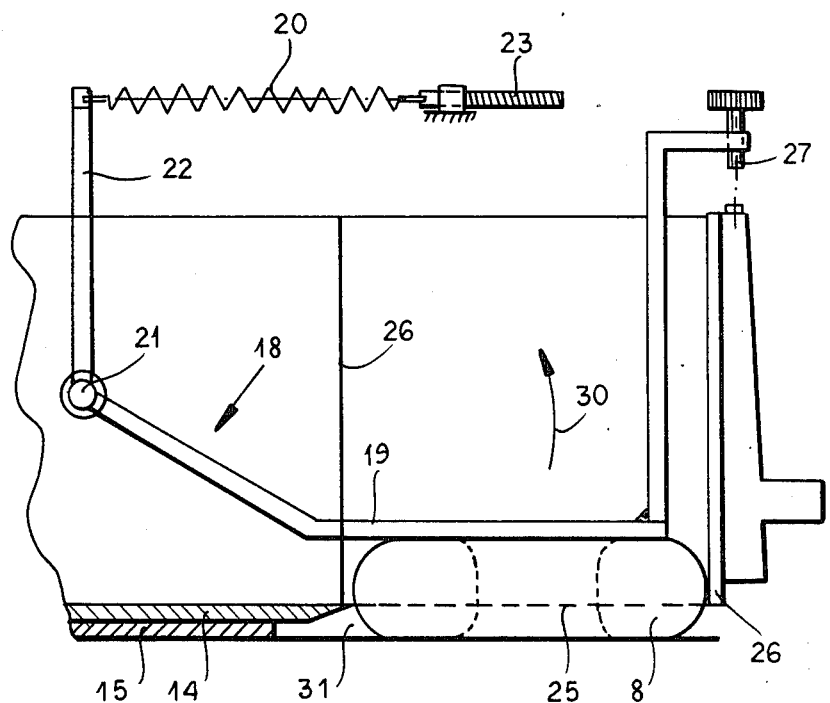
FIG. 6: a partially cross sectioned view of a part of the machine with a hold-down.

As can be seen, in particular, from FIG. 6, the hold-downs 18 consist of a double armed lever, that is arranged so as to be able to pivot about a shaft 21. One arm forms the pressure plate 19, whereas the spring 20 acts on the other arm 22, said spring being formed as a tension spring. In each instance the hold-downs 18 are attached to a side wall of the housing 1, their attachment being such that their level is adjustable relative to the cutter 14.

The cutting areas 16, 17 of the machine are in each instance defined by a stop 24 to which the baked goods that are to be cut by means of the rotating knife come to rest.

In the cutting areas 16, 17 within the housing 1, there is, in each instance, a cutting edge 25, this being formed by an angular plate 26 or the like that is secured within the housing. The level of the cutting edge 25 is adjustable so as to make it possible to match it to the upper side of the cutter 14 so that both run in one and the same plane.

The area of pivot of the pressure plates 19 of the hold-downs 18 are defined by the cams 27 or the like in the direction of the cutters 14, so that the pressure plates cannot come into contact with the upper side of the cutter 14 once a piece of baked goods has been cut into the desired number of slices. The interval formed by the cams 27 is also of importance since this makes it possible to slide the next piece of baked goods 8 that is to be sliced beneath the pressure plate 19, because of the rotation of the cutter 14.

Figure 4:
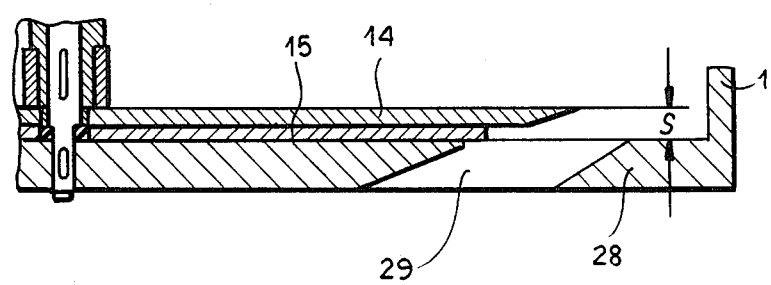
FIG. 4: a cross section on the line III—III in FIG. 3.
Figure 5:
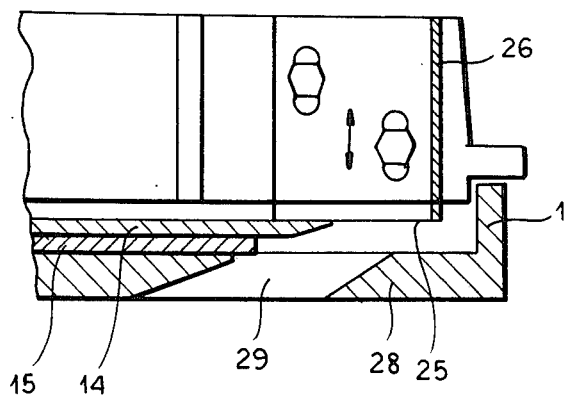
FIG. 5: a partially cross sectioned view of a portion of the machine.

As can be seen particularly from FIGS. 4 and 5, the disc 28 is provided with passages 29 in the cutting zones 16, 17, the slices that are removed dropping through these and into the hopper 11.

The cutting machine according to the present invention works as follows:

The baked goods 8 that are to be sliced and which are delivered by the conveyors 6, 7 pass into the chutes 9 and 10 and on into the actual cutting zone of the machine. Assuming that the cutting process is just beginning and that there are no baked goods beneath the pressure plates 19 of the hold-downs 18, these must be resting upon the cams 27, so that there is a specific distance between the upper surface of the cutter 14 and the lower side of the pressure plates 19. Because of the rotating cutter, the two pieces of baked goods 8 that are located in the cutter zone are picked up and thrust into the cutting areas 16, 17 of the machine, whereupon these pass under the pressure plates 19 of the hold-downs 18 under the action of the rotating cutters, whereupon these make an upwards movement in the direction indicated by the arrow 13 (FIG. 6). Now the baked goods 8 that are to be cut are firmly held in that they are resting against the stops 24.

As can be seen particularly from FIG. 6, the cutter 14 cuts a slice 31 from the annular bagel, and this slice then drops through the passage 29 made in the disc 28 and down into the hopper 11. Because of the action spring 20, once it has passed through the spiral cutter 14, the baked goods 8 that is to be cut is pressed down by an amount equal to the thickness of the slice 31 that has just been removed, so that the next slice can be cut.

After the next step, the pressure plates 19 lie on the cams 27, so that the distance that has been set between the upper side of the cutter 14 and the lower side of the pressure plate 19 of the hold-downs 18 is ensured.

I claim:

1. A machine to slice essentially annular baked goods comprising:
    a housing for said machine;
    a vertical shaft arranged within said housing;
    at least one spiral cutter arranged within said housing and traversing at least one cutting area;
    at least one hold-down consisting of a double-armed lever having a pivot shaft, a first arm which forms a pressure plate and a second arm, said pivot shaft pivotally connecting an end of said plate with an end of said second arm, and a major portion of said plate being oriented substantially parallel to the cutter to apply pressure to said baked goods in a direction perpendicular to the cutter;
    a tension spring attached to and acting upon said second arm of said lever; and
    at least one stop at a periphery of said cutting area against which said baked goods rest.

2. A machine as in claim 1 further comprising a disc that is attached to the vertical shaft and the spiral cutter secured to said disc.

3. A machine according to claim 1 wherein the stop has a shape matched to a shape of the baked goods that are to be cut.

4. A machine according to claim 1, further comprising a cutting edge for each cutting area within the housing.

5. A machine according to claim 4 wherein the cutting edge has a height that is adjustable.

6. A machine according to claim 1, further comprising at least one side wall at least partially defining said housing, and the hold-down attached in each instance to a side wall.

7. A machine according to claim 1 wherein the hold-down has a height that can be adjustable relative to the cutter.

8. A machine according to claim 1, further comprising a cam defining in a direction of the cutter a pivoting range of the plate of the hold-down.

9. A machine according to claim 1, wherein tension of the tension spring is adjustable.

10. A machine according to claim 1 further comprising passages for slices that have been sliced, said passages provided in the cutting area of the cutter.

11. A machine according to claim 1, further comprising a hopper arranged beneath the housing.

12. A machine according to claim 1 further comprising at least one chute provided within the housing.

13. A machine according to claim 12 wherein the chute ends before the cutting area as viewed in a direction of movement of the cutter.

14. A machine according to claim 1 further comprising a drive motor controlled by an angle drive, said motor connected to the vertical shaft which protrudes from the housing.

15. A machine to slice essentially annular baked goods comprising:
 a housing for said machine;
 a vertical shaft arranged within said housing;
 at least one spiral cutter arranged within said housing and traversing at least one cutting area;
 a disc attached to said vertical shaft and said spiral cutter secured to said disc;
 at least one intermediate plate positioned between said spiral cutter and the disc;
 at least one hold-down consisting of a double-armed lever having a pivot shaft, a first arm which forms a pressure plate and a second arm, said pivot shaft pivotally connecting an end of said plate with an end of said second arm;
 a tension spring attached to and acting upon said second arm of said lever; and
 at least one stop at a periphery of said cutting area against which said baked goods rest.

* * * * *

UNITED STATES PATENT AND TRADEMARK OFFICE
CERTIFICATE OF CORRECTION

PATENT NO. : 4,776,252
DATED : October 11, 1988
INVENTOR(S) : Reiner HERLITZIUS

It is certified that error appears in the above-identified patent and that said Letters Patent is hereby corrected as shown below:

ON THE TITLE PAGE:
    Item [73] Assignee's name is to read:

-- Gebruder Herlitzius GmbH & Co. KG --

Between line [22] and line [51] insert the following to read:

--[30] Foreign Application Priority Data
October 2, 1985    Fed. Rep. of Germany    85 28 097  --

Signed and Sealed this

Twenty-eighth Day of March, 1989

*Attest:*

DONALD J. QUIGG

*Attesting Officer*    *Commissioner of Patents and Trademarks*